United States Patent
Li et al.

(10) Patent No.: US 6,424,986 B1
(45) Date of Patent: Jul. 23, 2002

(54) ARCHITECTURE OF DISCRETE WAVELET TRANSFORMATION

(75) Inventors: Yongming Li; Hongyi Chen; Xiaodong Wu, all of Beijing (CN)

(73) Assignee: Winbond Electronics (H.K.) Ltd., Kowloon (HK)

( * ) Notice: Subject to any disclaimer, the term of this patent is extended or adjusted under 35 U.S.C. 154(b) by 0 days.

(21) Appl. No.: 09/321,664

(22) Filed: May 28, 1999

(51) Int. Cl.$^7$ ................................................ G06F 17/14
(52) U.S. Cl. ...................................................... 708/400
(58) Field of Search ................................ 708/400–405, 708/410

(56) References Cited

U.S. PATENT DOCUMENTS

| | | | |
|---|---|---|---|
| 5,859,788 A | * | 1/1999 | Hou ............................ 708/400 |
| 5,984,514 A | * | 11/1999 | Greene et al. ............... 708/203 |

OTHER PUBLICATIONS

"VLSI Architectures for Discrete Wavelet Transforms", Parhi et al, IEEE Trans. on VLSI Systems, vol. 1 No. 2, Jun. 1993, pp. 191–202.*

Chakrabarti et al, "Efficient Realizations of the Discrete and Continuous Wavelet Transforms: Form Single Chip Implementations to Mappings on SIMD Array Computers", IEEE Trans. on Signal Processing, vol. 43, No. 3, Mar. 1995, pp. 759–771.*

Grzeszczak et al, "VLSI Implementation of Discrete Wavelet Transform", IEEE on VLSI Systems, vol. 4, No. 4, Dec. 1996, pp. 421–433.*

Mallat, "Multifrequency Channel Decompositions of Images and Wavelet Models", IEEE Trans. on Acoustics, Speech, and Signal Processing, vol. 37, No. 12, Dec. 1989, pp. 2091–2110.*

* cited by examiner

*Primary Examiner*—Tan V. Mai
(74) *Attorney, Agent, or Firm*—J. C. Patents

(57) ABSTRACT

A VLSI wavelet transform (WT) architecture suitable for use in a discrete wavelet transform (DWT) or a discrete wavelet packet transform (DWPT). The WT architecture has a multiplier; an accumulator; at least two address generators that has a first address generator and a second address generator; a control unit; a memory of result that stores computation results; and a memory of table, which prestores all possible weights, each of which weights is a product of some specified filter coefficients for performing a DWT/DWPT with parameters of decomposition level, length of data segment, and filter length. The first address generator and the control unit receive data input, the control unit exports control signals to multiplier, accumulator, second address generator, and memory of table. The memory of the table also receives outputs from the first address generator and the second address generator to select the desired weights of the filter coefficients, which are sent to the multiplier to obtain a product with the data input. The product is sent to the accumulator to add into a corresponding sum, and the memory of result receives the corresponding sum and an address output of the second address generator to address the received corresponding sum, in which when all of the data input in the DWT/DWPT are completely inputted, each the corresponding sum is an end result of the DWT/DWPT.

8 Claims, 5 Drawing Sheets original data(j=0)　　$X_{0,0}^0$ $X_{0,1}^0$ $X_{0,2}^0$ $X_{0,3}^0$ $X_{0,4}^0$ $X_{0,5}^0$ $X_{0,6}^0$ $X_{0,7}^0$ (j=1)　　$X_{0,0}^1$ $X_{0,1}^1$ $X_{0,2}^1$ $X_{0,3}^1$ $X_{1,0}^1$ $X_{1,1}^1$ $X_{1,2}^1$ $X_{1,3}^1$ (j=2)　　$X_{0,0}^2$ $X_{0,1}^2$ $X_{1,0}^2$ $X_{1,1}^2$ $X_{2,0}^2$ $X_{2,1}^2$ $X_{3,0}^2$ $X_{3,1}^2$ output results(j=3)　　$X_{0,0}^3$ $X_{1,0}^3$ $X_{2,0}^3$ $X_{3,0}^3$ $X_{4,0}^3$ $X_{5,0}^3$ $X_{6,0}^3$ $X_{7,0}^3$

FIG. 6 original data(j=0)　　$X_{0,0}^0$ $X_{0,1}^0$ $X_{0,2}^0$ $X_{0,3}^0$ $X_{0,4}^0$ $X_{0,5}^0$ $X_{0,6}^0$ $X_{0,7}^0$ (j=1)　　$X_{0,0}^1$ $X_{1,0}^1$ $X_{0,1}^1$ $X_{1,1}^1$ $X_{0,2}^1$ $X_{1,2}^1$ $X_{0,3}^1$ $X_{1,3}^1$ (j=2)　　$X_{0,0}^2$ $X_{2,0}^2$ $X_{1,0}^2$ $X_{3,0}^2$ $X_{0,1}^2$ $X_{2,1}^2$ $X_{1,1}^2$ $X_{3,1}^2$ output results(j=3)　　$X_{0,0}^3$ $X_{4,0}^3$ $X_{2,0}^3$ $X_{6,0}^3$ $X_{1,0}^3$ $X_{5,0}^3$ $X_{3,0}^3$ $X_{7,0}^3$

FIG. 7

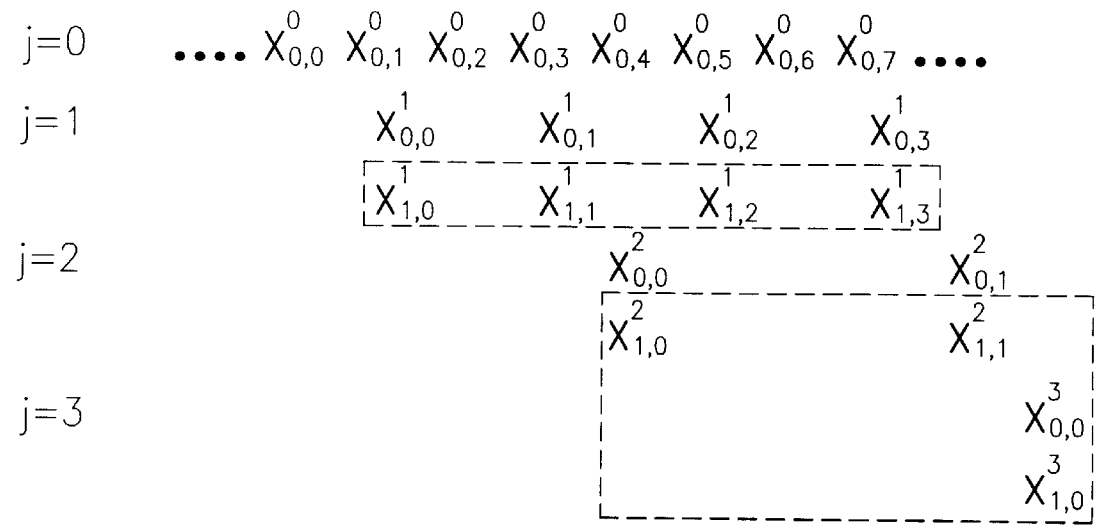

$j=1$              $X_{0,0}^1$       $X_{0,1}^1$       $X_{0,2}^1$       $X_{0,3}^1$ $X_{1,0}^1$       $X_{1,1}^1$       $X_{1,2}^1$       $X_{1,3}^1$ $j=2$                               $X_{0,0}^2$               $X_{0,1}^2$ $X_{1,0}^2$               $X_{1,1}^2$ $X_{2,0}^2$               $X_{2,1}^2$ $X_{3,0}^2$               $X_{3,1}^2$ $j=3$                                                          $\begin{bmatrix} X_{0,0}^3 \\ X_{1,0}^3 \\ X_{2,0}^3 \\ X_{3,0}^3 \\ X_{4,0}^3 \\ X_{5,0}^3 \\ X_{6,0}^3 \\ X_{7,0}^3 \end{bmatrix}$

FIG. 9

ARCHITECTURE OF DISCRETE WAVELET TRANSFORMATION

BACKGROUND OF THE INVENTION

1. Field of the Invention

This invention relates to signal processing, and more particularly to an architecture for performing discrete wavelet transformation (DWT) in a very large scale integration (VLSI) architecture design.

2. Description of Related Art

In the past years, there has been an enormous increase in the applications of wavelets scientific disciplines. One of the main contributions of wavelet theory is related to the discrete-time filterbank with the theory of continuous time function space. Typical applications of wavelets include signal processing, image processing, numerical analysis, statistics, biomedicine, and so on. Wavelet transform offers a wide variety of useful features, in contrast to other transforms, such as Fourier transform or cosine transform.

Since discrete wavelet transform (DWT) needs intensive computations, several solutions using special purpose parallel processors have been proposed, such as published papers, IEEE Trans., 1993, VLSI System-1, (2), pp. 191–202, IEEE Trans., 1995 SP-43, (3), pp. 759–771, and IEEE Trans., 1996, VLSI System-4, (4), PP. 421–433. In these solutions, DWT usually is based on a recursive pyramid algorithm (RPA) so as to output results in a real-time way, in which the pyramid algorithm (PA) is originally developed by S. Mallat on IEEE Trans. Acoust., speech signal processing (37) no. 12 pp. 2091–2110, 1989. However, the typical solutions with the RPA method are not effective to a wavelet packet transform (DWPT).

The RPA includes two basic transformation eqs. 1.a and 1.b:

$$c_{j+1,m} = \sum_{k} h_{k-2m} c_{j,k}, \quad (1.a)$$

$$d_{j+1,m} = \sum_{k} g_{k-2m} c_{j,k}, \quad (1.b)$$

where $c_{j,k}$ is the k-th scale coefficient at a decomposition level j, and $d_{j,k}$ is the k-th wavelet coefficient at the decomposition level j. With respect to the eqs. 1.a and 1.b, FIG. 1 is a schematic block diagram, schematically illustrating a typical computation method for a three-stage DWT decomposition using RPA. In FIG. 1, $c_0$ ($c_{0,k}$) is an initial input, $c_{j,k}$ are scale coefficient, and $d_{j,k}$ are wavelet coefficients. H and G are the filters corresponding to the scale function and wavelet function, respectively. The downward arrow means retaining every other sample. Each filter output is decimated by a factor of 2.

This leads to the fact that the transformation is implemented recursively with the same filters G and H, and that the structures are greatly dependent on the used filters. If the length of the filter is long, the architectures are inefficient and cannot be suitably implemented in a single chip because of their scale size. Particularly, the current typical architectures are not effective to the DWPT to achieve a real-time computation.

SUMMARY OF THE INVENTION

It is at least an objective of the present invention to provide an address generator to produce a specified coefficient sequence incorporating with a DWT/DWPT architecture so as to improve the computation efficiency, in which two buffer memory system is also employed.

It is at least another objective of the present invention to provide a wavelet transformation architecture, which has high computational efficient and can be easily fabricated in a single integrated circuit (IC) chip or an on-chip structure.

In accordance with the foregoing and other objectives of the present invention, an address generator to produce a data sequence with a binary bit-reverse order, suitable for use in a discrete wavelet transform (DWT) or a discrete wavelet packet transform (DWPT) is provided. The address generator comprises a bit-reverse unit for receiving a frequency band index and generate the bit-reverse order of the band index. The address generator further includes a DFF unit serving as a latch, a multiplexer, controlled by a control signal, for receiving outputs from the bit-reverse unit and the DFF unit and selectively exporting one of them. A frequency band base unit is also included for receiving a decomposition level j so as to produce a base number of $2^j$. The address generator further comprises an adder for receiving base number and the multiplexer and exporting an address. The address is also feedback to the DFF unit so that the data sequence with the binary bit-reverse order is obtained.

As the control signal CTRL is at a first logic level, the address generator is set to start a new frequency band, in which the multiplexer selects the output from the bit-reverse unit. As the control signal CTRL is at a second logic level, the address generator is set to generate rest internal address in the same frequency index, in which the multiplexer selects a previous content stored in the latch unit and the previous content is added with the base number of $2^j$. Therefore, a regular data sequence is rearranged into a bit-reverse data sequence.

In the above address generator of the invention, the decomposition level j can orderly vary from 0 up to a desired level J or vary from the desired level J to 0 so as to respectively perform the DWT or the DWPT forwardly and inversely.

The address generator can generate the data sequence with the special bit-reverse order and can be used in a DWT/DWPT operation. For example, the address generator is included in a two-buffer system for the DWT or the DWPT to perform a real-time DWT/DWPT. The two-buffer system can include two buffers, which are alternating their functions in an operation time frame with a frame length of N, which is an integer. If one of the buffers is used for storing input data and exporting results, the other one of the buffers is used for performing transform, in which the data sequence in each of the buffers is based on the address generator.

The two-buffer system includes an address switch, which receives an address input/output (I/O) and an address for transform. Then, address switch initially switches the buffers and passes the received addresses to the buffers.

Moreover, the two-buffer system includes a data switch that is used to alternatingly switch the buffers so as to recursively communicate with an I/O unit and an process unit in the real-time DWT/DWPT. Each of the buffers has a length equal to the frame length.

In accordance with the foregoing and other objectives of the present invention, a very large scale integration (VLSI) wavelet transform (WT) architecture suitable for use in a discrete wavelet transform (DWT) or a discrete wavelet packet transform (DWPT) is provided. The WT architecture includes a multiplier, an accumulator, at least two address generators, which comprises a first address generator and a second address generator, a control unit, a memory of result, which stores computation results, and a memory of table.

The memory of table pre-stores a plurality of weights of all possible filter coefficient products for performing a DWT/DWPT with parameters of J, N, and L, respectively representing a decomposition level, a length of data segment, and a filter length.

In the WT architecture, the first address generator and the control unit receive a data input, the control unit exports control signals to the multiplier, the accumulator, the second address generator, and the memory of the table. The memory of the table also receives outputs from the first address generator and the second address generator to select the desired weights of the filter coefficient product, which are sent to the multiplier to obtain a product of the desired weight of the filter coefficient product. The product is sent to the accumulator to add into a corresponding sum. The memory of result receives the corresponding sum and an address output of the second address generator to address the received corresponding sum. When all of the data input in the DWT/DWPT are completely inputted, each the corresponding sum is an end result of the DWT/DWPT.

The control signals from the control unit to the multiplier at least includes a first signal and a second signal. The first signal intermediately enters a first DFF unit and a demultiplexer and the second signal directly enters the demultiplexer. The demultiplexer then produces a first control signal of the control signals to control a communication between the memory of table and the multiplier and a second control signal of the control signals to control the multiplier for performing production of the desired weights with the data input.

The control signals from the control unit to the second address generator at least includes a third signal, which enters a second DFF unit, and the second DFF unit also receives a feedback of the corresponding sum from the accumulator. A third control signal of the control signals is therefore produced to control the accumulator to add the product to the corresponding sum.

The control signals from the control unit to the second address generator at least includes a fourth control signal so as to control the second address generator to select the desired weights of the filter coefficient product and address the corresponding sum in the memory of result.

All of the weights of the filter coefficient product are pre-stored in a specified array structure that includes, for example, an 1-dimention array or a 2-dimention array.

Moreover, the memory of table and the memory of result can be externally coupled to the WT architecture so that the memory of table and the memory of result are programmable. The other portion of the WT architecture other than the memory of table and the memory of result can be fabricated in a single VLSI chip or on-chip. The memory of table can be also generated by a table generator.

In conclusion, the memory of table servers as a look-up table can reduce the size of the architecture and the computation load. The DWT and the DWPT can be efficiently performed.

BRIEF DESCRIPTION OF DRAWINGS

The invention can be more fully understood by reading the following detailed description of the preferred embodiment, with reference made to the accompanying drawings as follows:

FIG. 6 is a block diagram illustrating a standard data sequence for the DWPT;

FIG. 7 is a block diagram illustrating a desired data order with the bit-reverse order of the index of the frequency band;

FIG. 8 is a block diagram illustrating the data order in each decomposition level for a DWT manner; and FIG. 9 is a block diagram illustrating the data order in each decomposition level for a DWPT manner.

DETAILED DESCRIPTION OF PREFERRED EMBODIMENTS

Figure 1:
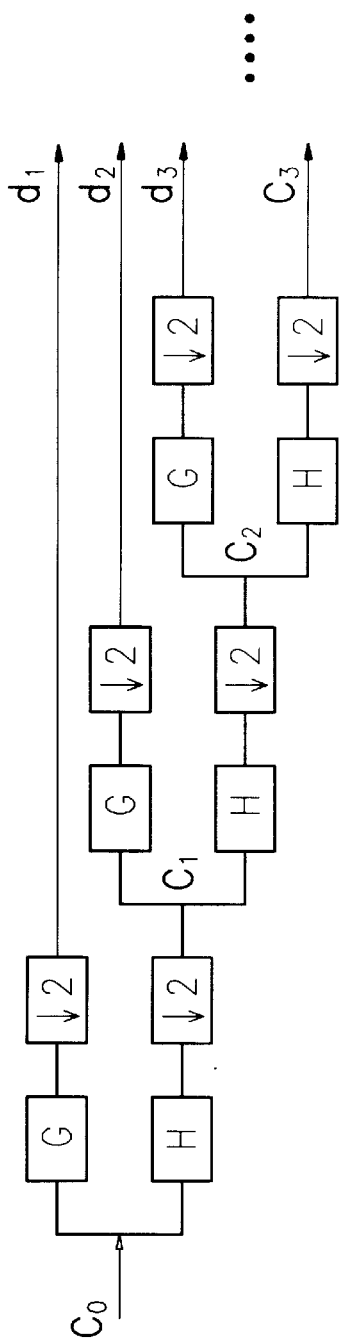
FIG. 1 is a schematic block diagram, schematically illustrating a typical computation method for a three-stage DWT decomposition using recursive pyramid algorithm.

The invention propose a more efficient method to perform the DWT/DWPT using a two-buffer table system or using a look-up table structure.

EXAMPLE 1

The DWT/DWPT transform as generally described in eqs. 1a and 1b typically requires a lot of computation on many coefficients with respect to the filter functions G and H. In order to efficiently perform the transform, the invention introduces a two-buffer system, also seen in Proc. IWSSIP'98', pp. 40–43, to ease the tremendous transformation. The two-buffer system in a DWT/DWPT has a property to efficiently perform the calculation in real-time. One buffer is used for input and output, while the other one is used for performing transform. Two buffers operates alternatively by switching between the I/O and the transform. Therefore, the calculation can be perform in real-time on a single time frame. Once the input data are completely inputted to the two buffer system, the final results are obtained in the same computation cycle, which may include only one clock cycle or several.

Since only one of the buffers is used for the DWT/DWPT, the intermediate results should be stored between the outputs in the same buffer. This leads a fact that the order of the results is not as clear as those in software implementation. In order to implement the DWT/DWPT in hardware, an address generator to generate a desired data sequence is first needed. The data in DWT/DWPT has some properties. An example is used for descriptions.

The data of the DWT/DWPT in the RPA method typically has a regular order. Suppose that the data are denoted as $X^j_{m,k}$, where j is the decomposition level, m is the index of frequency band, and k is the time index. A frame length N is supposed to be N=8 and a total decomposition level J is supposed to be J=3, in which j=0,1, . . . J; m=0,1 for DWT and m=0,1, . . . , $2^j-1$ for DWPT; and k=0,1, . . . , $N/2^j-1$. A standard data sequence for the DWPT is shown in FIG. 6. For the conventional manner, one buffer can have two buffer regions to alternatively store the intermediate data. But if the data is a large amount, the buffer needs a large memory capability. This causes a heavy hardware load. In order to have two-buffer system but each buffer needs not to be divided into two buffer regions, the data order of $X^j_{m,k}$ in the buffer cannot be randomly disposed.

Since only one buffer is used for transform at a time, the temporary or final results for each computation cycle are stored in the same buffer. The data order therefore cannot be randomly arranged. A desired data order called a binary bit-reverse order is desired. The binary bit-reverse order is defined as adding one binary bit form the last binary bit with 0 and then with 1. For example, an one bit binary data sequence with (0, 1) is added with one binary bit so that it becomes (00, 10, 01, 11). This binary bit-reverse order can be easily by reversing the bit order. A regular number is represented in a binary form, and then reverse the binary order of the binary form so as to obtain the bit-reverse order. For example, the four numbers (0, 1, 2, 3) are (00, 01, 10, 11) in two bits or (000, 001, 010, 011) in three bits. One takes the reversed order and becomes (00, 10, 01, 11) or (000, 100, 010, 110), which are converted into the regular numbers as (0, 2, 1, 3) or (0, 4, 2, 6). The regular numbers (0, 2, 1, 3) or (0, 4, 2, 6) are the bit-reverse order. The converting method of the bit-reverse order can be achieved by a proper design in hardware.

A desired data order with the bit-reverse order of the index of the frequency band is shown in FIG. 7. For each next decomposition level j, a binary value $2^j$ is timed, then a binary 0 is added, and then a binary 1 is added. Each frequency band with the index m includes $2^j$ elements. Since the data $X^j_{m,k}$ is regularly changing in the DWT/DWPT, the bit-reverse order allows the data $X^j_{m,k}$ to be regularly arranged in one buffer. The buffer size can therefore be reduced. The two-buffer system therefore can efficiently perform the DWT/DWPT with a reduced buffer memory size.

Figure 2:
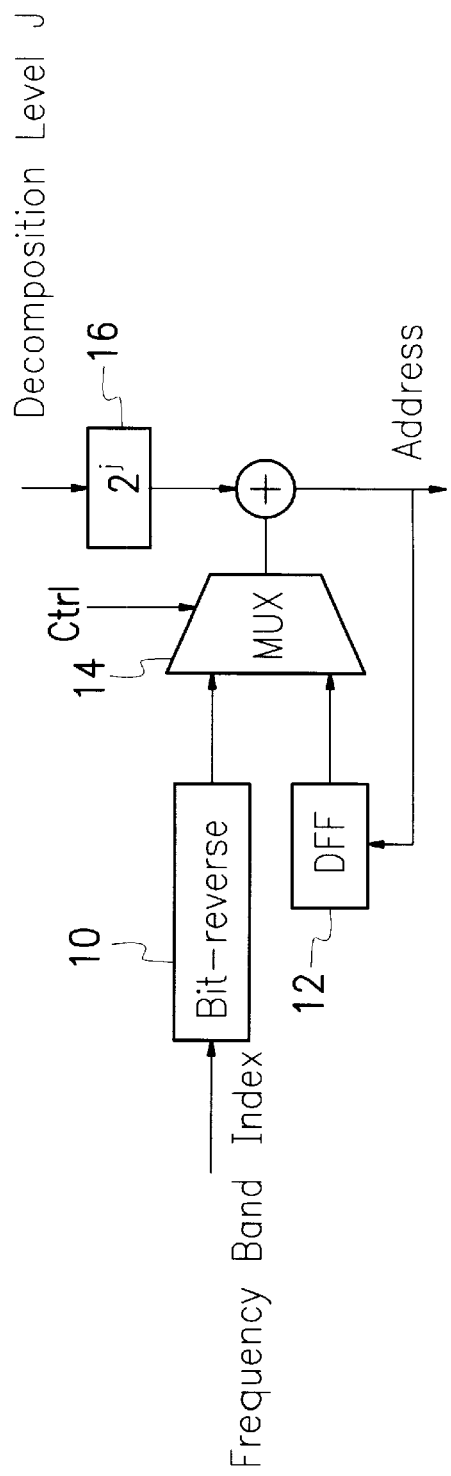
FIG. 2 is a block diagram, schematically illustrating an address generator, according to a first preferred embodiment of the invention.

The data sequence with the bit-reverse order in FIG. 7 can be generated by a hardware address generator as shown in FIG. 2. In FIG. 2 the address generator of the invention receives a frequency band index m and a decomposition level j and exports an address with the bit-reverse order. The address generator includes a bit-reverse unit 10, a D-type flip flop (DFF) unit 12 serving as a latch, a multiplexer (MUX) 14, a frequency band base unit 16, and an adder. The address generator is also controlled by a control logic signal CTRL. The bit-reverse unit 10 receives the frequency band index m and converts the index m into a bit-reverse order, which is further exported to the MUX 14. The D-type flip flop (DFF) unit 12 serving as a latch receives a feedback from the adder and does a feedback to the multiplexer 14.

As the previous descriptions, the data $X^j_{m,k}$ has $2^j$ elements in the same frequence band index m. The operation of the address generator is following.

As the CTRL is "1", the address generator is indicated to start a new frequency band. The MUX is controlled by the CRTL to select the bit-reverse order of the index m. As the CRTL is "0", the address generator is set to perform the internal computation for the desired frequency band. In this status, the MUX selects the previous content latched in the DFF unit 12. The frequency band base unit 16 can produce a quantity of $2^j$ as the decomposition level j is inputted, and the base number $2^j$ is coupled to the adder so as to add $2^j$ to the output of the MUX 14 during the internal computation is performing. As a result, the order in FIG. 7 is obtained.

For example, for a decomposition level j=2, the frequency band index m can vary from 0 to $2^j-1=3$, and the time index k can run from 0 to $N/2^j-1=8/4-1=1$. Therefore, the $0^{th}$ data $X^2_{0,0}$ in FIG. 6 with m=0 is put at the $0^{th}$ position when k=0. The bit-reverse order of index m is stored in the DFF 12. The CTRL is then set to "0". When k=1, the MUX 14 selects the previous content and add with the base number $2^2=4$ so that the data $X^2_{0,1}$ is located at the $4^{th}$ position. The index m=1 is inputted to the bit reverse unit 10, and then the bit-reverse order is 2, so that the data $X^2_{1,0}$ is located at the $2^{nd}$ position and the data $X^2_{1,1}$ is located at the $6^{th}$ position, and so on. As a result, the data order of FIG. 7 is obtained by the address generator.

The address generator can also operated an inverse order by running the j from J to 0 so as to achieve an inverse operation of the DWT/DWPT. The index j can be also properly controlled to respectively operate DWT or DWPT as desired.

The address generator of FIG. 2 as described above has a convenient bit-reverse data order to allow that only one buffer is needed for performing DWP/DWPT. The two-buffer system now can employ the address generator for performing DWT/DWPT.

Continuing the same example, the data to be outputted for the DWT are:

$X^1_{1,0}, X^1_{1,1}, X^2_{1,0}, X^1_{1,2}, X^1_{1,3}, X^2_{1,1}, X^3_{0,0}, X^3_{1,0}$.

All of which are those in dashed box in FIG. 8. For the DWPT, there are eight data to be outputted as listed in FIG. 9. The data in the dashed box are:

$X^3_{0,0}, X^3_{1,0}, X^3_{2,0}, X^3_{3,0}, X^3_{4,0}, X^3_{5,0}, X^3_{6,0}, X^3_{7,0}$.

Figure 3:
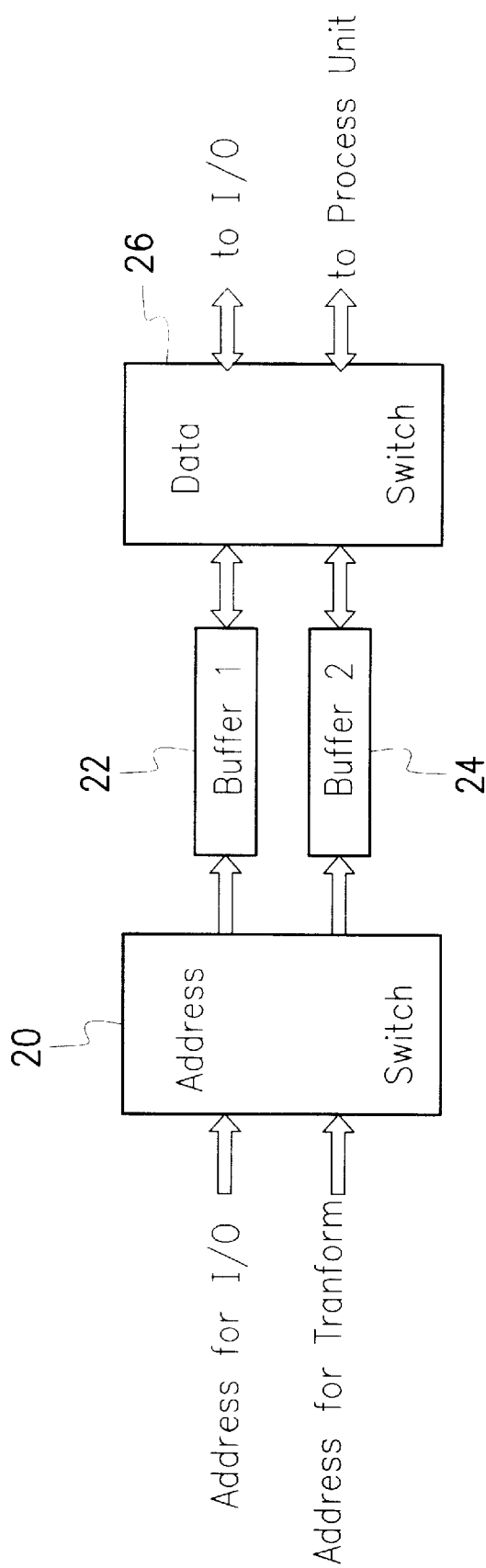
FIG. 3 is a block diagram, schematically illustrating a two-buffer system for a DWT/DWPT, according to the first preferred embodiment of the invention.
Figure 4:
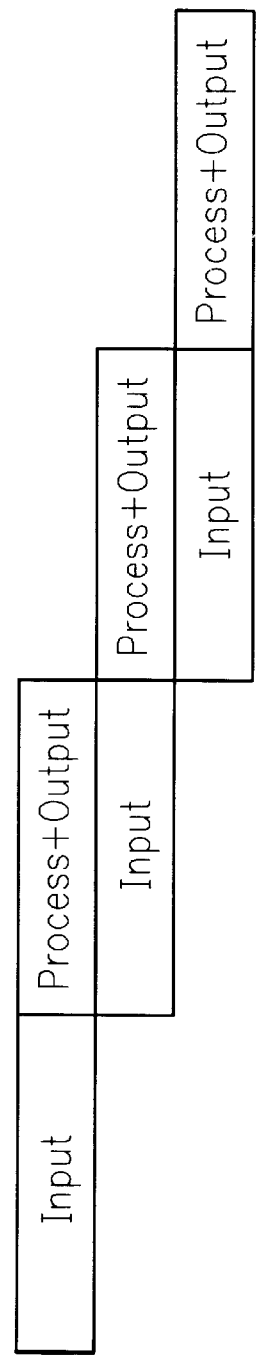
FIG. 4 is a time sequence, schematically illustrating the functions of the two buffers varying with the time frame, according to the first preferred embodiment of the invention.

The computation is performed in parallel so as to compute in real-time. The two-buffer system of the system is shown in FIG. 3. FIG. 3 is a block diagram, schematically illustrating a two-buffer system for a DWT/DWPT, according to the first preferred embodiment of the invention, and FIG. 4 is a time sequence, schematically illustrating the functions of the two buffers varying with the time frame, according to the first preferred embodiment of the invention.

In FIG. 3, the two-buffer system includes an address switch, two buffers 22, 24, and a data switch 26. The two buffers 22, 24 are operated with alternating functions in an operation time frame with a frame length of N, which is an integer. If one of the buffers 22, 24 is used for storing input data and exporting results, the other one of the buffers 22, 24 is used for performing transform, in which the data sequence in each of the buffers is based on the address generator in a bit-reverse order, which can be generated by the address generator in FIG. 2.

The buffers 22, 24 are coupled the address switch 20 and the data switch 26. The address switch receives an address input/output (I/O) and an address for transform, and initially switch the buffers 22, 24 as desired and passes the received addresses to the buffers 22, 24. The data switch 26 is used to alternatingly switch the buffers 22, 24 so as to recursively communicate with an external I/O unit and an external process unit in the real-time DWT/DWPT. The operation time sequence is like a pipeline as show in FIG. 4. Data are initially inputted at the first computation cycle. From the second computation cycle, the two buffers 22, 24 are alternatively performing I/O and transform unti the final output. By the use of the address generator of FIG. 2, the two-buffer system for DWT/DWPT is successfully achieved.

EXAMPLE 2

Another solution to improve the performance the DWT/DWPT through hardware method is also introduced here by mainly using a look-up table, which store all pre-calculated filter coefficients as described in FIG. 1.

For the conventional computation structure in FIG. 1, it leads a fact that the transform is implemented recursively with the same filters G and H. This structure is greatly dependent on the filters used. If the length of the filter is long, the architecture of FIG. 1 is not efficient and not suitable for to be implemented in a single chip due to its large scale.

For the invention, the structure is modified. For example, the eq. 1.a can be rewrite in a form:

$$c_{j,m} = \sum_{k_j} h_{k_j-2m} \sum_{k_{j-1}} h_{k_{j-1}-2k_j} \sum_{k_{j-2}} h_{k_{j-2}-2k_{j-1}} \cdots \sum_{k_1} h_{k_1-2k_2} c_{0,k_1}. \quad (2)$$

In eq. 2, each result $c_{j,m}$ is the sum of several product terms while each term is the product of an input data and a weight calculated with the filter coefficients. It is similar for the eq. 1.a. For example, suppose that filter length L=4, the length N of the data segment is 8 and the decomposition level J is 3, the contribution of the $c_{0,0}$ to the $d_{3,0}$ is: $c_{0,0}$ ($h_0h_0h_0$+ $h_0h_2h_1$+$h_0h_0h_2$+$h_2h_3h_0$+$h_2h_3h_2$+$h_0h_2h_3$+$h_2h_1h_1$+$h_2h_1h_3$).

Since all the filter coefficients, parameters J, N, and L are known before calculation, one can calculate all the weights in advance and save all the weights in a table or a matrix, which typically is an array. As an input data each time is inputted, the product terms are calculated and added to a corresponding sum. When all the input data are completely inputted, the sum of the product terms is the final corresponding output result.

Figure 5:
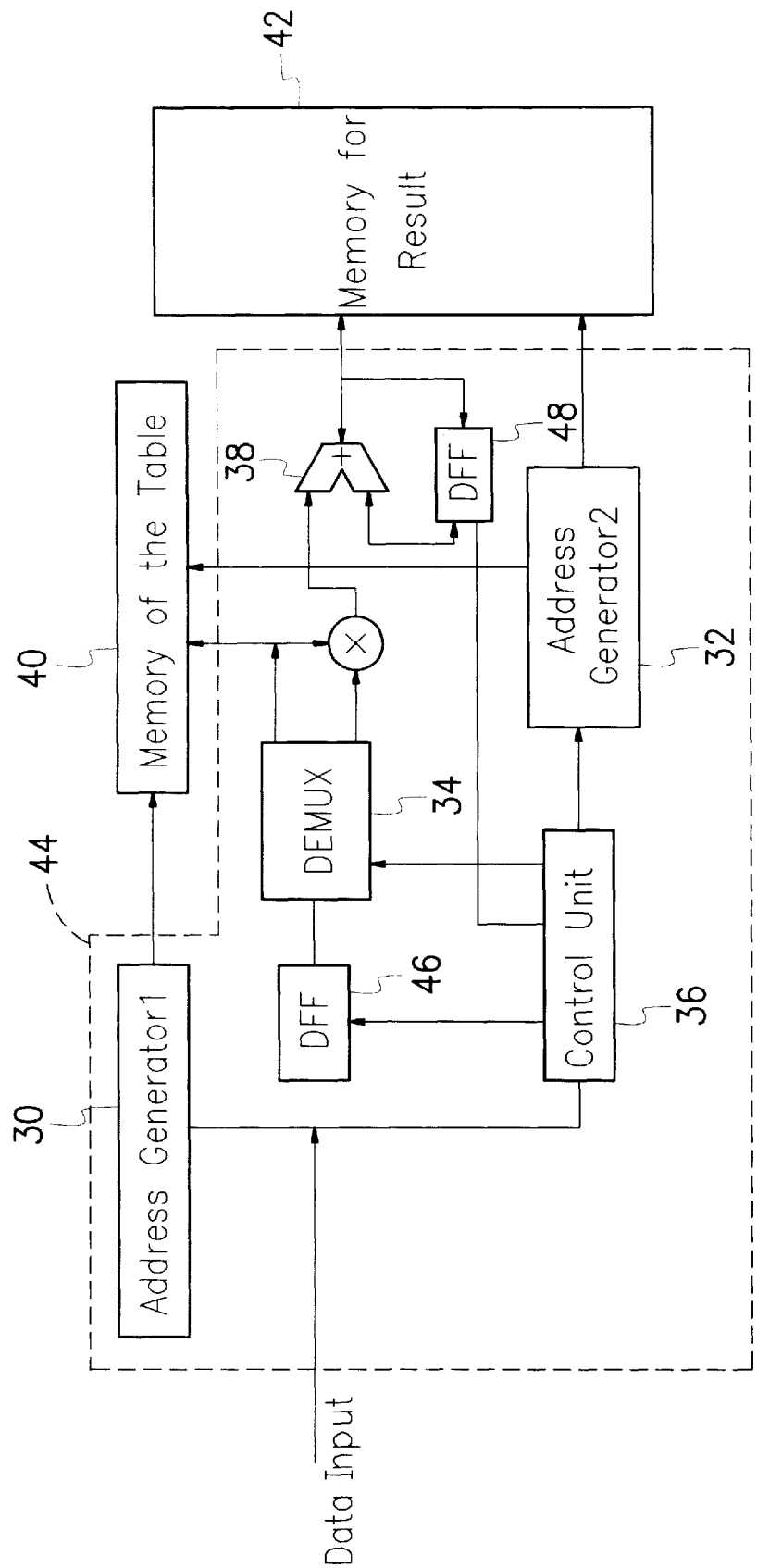
FIG. 5 is a block diagram, schematically illustrating a WT architecture with a look-up table design, according to a second preferred embodiment of the invention.

According to the algorithm described above, a hardware implementation can be achieved as shown in FIG. 5. FIG. 5 is a block diagram, schematically illustrating a WT architecture with a look-up table design, according to a second preferred embodiment of the invention.

In FIG. 5, the DWT/DWPT architecture includes a multiplier, an accumulator 38, at least two address generators, which includes a first address generator 30 and a second address generator 32, a control unit 36, a memory of result 42, which stores computation results, and a memory of FIG. 90. The address generators 30, 32 include a general type of address generator and are not necessary to be the bit-reverse generator of FIG. 2.

The memory of FIG. 90 pre-stores weights of all possible filter coefficient products for performing the DWT/DWPT with parameters of J, N, and L defined above.

In the WT architecture, the first address generator 30 and the control unit 36 receive a data input, the control unit 36 exports several control signals respectively to the multiplier, the accumulator 38, the second address generator 32, and the memory of FIG. 90. The memory of the FIG. 90 also receives outputs from the first address generator 30 and the second address generator 32 to select the desired weights of the filter coefficient product, which are sent to the multiplier to obtain a product of the desired weight of the filter coefficient product. The product is sent to the accumulator 38 to add into a corresponding sum. The memory of result 42 receives the corresponding sum and an address output of the second address generator 32 to address the received corresponding sum. When all of the data input in the DWT/DWPT are completely inputted, each the corresponding sum is an end result of the DWT/DWPT.

The control signals from the control unit 36 to the multiplier at least includes a first signal and a second signal. The first signal intermediately enters a first DFF unit 46 and a demultiplexer 34 and the second signal directly enters the demultiplexer 34. Each of the DFF units in the invention is serving as a latch function. The demultiplexer 34 then produces a first control signal of the control signals to control a communication between the memory of FIG. 90 and the multiplier and a second control signal of the control signals to control the multiplier for performing production of the desired weights with data input.

The control signals from the control unit 36 to the second address generator 32 at least includes a third signal, which enters a second DFF unit 48, and the second DFF unit 48 also receives a feedback of the corresponding sum from the accumulator 38. A third control signal of the control signals is therefore produced to control the accumulator 38 to add the product to the corresponding sum.

The control signals from the control unit 36 to the second address generator 32 at least includes a fourth control signal so as to control the second address generator 32 to select the desired weights of the filter coefficient product and address the corresponding sum in the memory of result.

All of the weights of the filter coefficient product are pre-stored and pre calculated in a specified array structure such as a table or a matrix.

Moreover, the memory of FIG. 90 and the memory of result 42 can be externally coupled to the WT architecture so that the memory of FIG. 90 and the memory of result 42 are programmable with flexible parameters J, L, and N. A portion 44 of the DWT/DWPT architecture other than the memory of table and the memory of result can be fabricated in a single VLSI chip or on-chip. The memory of FIG. 90 can be also generated by a table generator.

In conclusion, the memory of table servers as a look-up table can reduce the size of the architecture and the computation load. The DWT and the DWPT can be efficiently performed.

The scale of the memory is determined by the frame length N, in which the conventional is very dependent on the parameters J and L. The latency of computation is low, in which the results can be obtained in one clock when the last input is inputted.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A very large scale integration (VLSI) wavelet transform (WT) architecture suitable for use in a discrete wavelet transform (DWT) or a discrete wavelet packet transform (DWPT), the WT architecture comprising:

a multiplier;

an accumulator;

at least two address generators, which comprises a first address generator and a second address generator;

a control unit;

a memory of result, which stores computation results; and a memory of table, which pre-stores all possible weights, each of which weights is a product of some specified filter coefficients for performing a DWT/DWPT with parameters of J, N, and L, respectively representing a decomposition level, a length of data segment, and a filter length, wherein the first address generator and the control unit receive a data input, the control unit exports control signals to the multiplier, the accumulator, the second address generator, and the memory of table, the memory of table also receives outputs from the first address generator and the second address generator to select the desired weights of the filter coefficients, which are sent to the multiplier to obtain a product with the data input, the product is sent to the accumulator to add into a corresponding sum, and the memory of result receives the corresponding sum and an address output of the second address generator to address the received corresponding sum, in which when all of the data input in the DWT/DWPT are completely inputted, each the corresponding sum is an end result of the DWT/DWPT.

2. The WT architecture of claim 1, wherein the control signals from the control unit to the multiplier at least includes a first signal and a second signal, of which the first signal intermediately enters a first LATCH unit and a demultiplexer and the second signal directly enters the demultiplexer so that the demultiplexer produces a first control signal of the control signals to control a communication between the memory of table and the multiplier and a second control signal of the control signals to control the multiplier for performing production of the desired weights with the data input.

3. The WT architecture of claim 1, wherein the control signals from the control unit to the second address generator at least includes a third signal, which enters a second LATCH unit, and the second latch unit also receives a feedback of the corresponding sum from the accumulator so as to produce a third control signal of the control signals to control the accumulator for adding the product to the corresponding sum.

4. The WT architecture of claim 1, wherein the control signals from the control unit to the second address generator at least includes a fourth control signal of the control signals so as to control the second address generator to select the desired weights of the filter coefficient product and address the corresponding sum in the memory of result.

5. The WT architecture of claim 1, wherein the all of the weights of the filter coefficient product are pre-stored in a specified array structure.

6. The WT architecture of claim 5, wherein the specified array structure comprises an 1-dimention array or a 2-dimention array.

7. The WT architecture of claim 1, wherein the memory of table and the memory of result are externally coupled to the WT architecture so that the memory of table and the memory of result are programmable and a portion of the WT architecture other than the memory of table and the memory of result can be fabricated in a single VLSI chip or on-chip.

8. The WT architecture of claim 1, wherein the WT architecture further comprises a table generator used to generate the memory of table.

* * * * *